United States Patent
Prociw et al.

(10) Patent No.: US 7,738,694 B2
(45) Date of Patent: Jun. 15, 2010

(54) CALIBRATION OF OPTICAL PATTERNATOR SPRAY PARAMETER MEASUREMENTS

(75) Inventors: Lev Alexander Prociw, Elmira (CA); Harris Shafique, Longueuil (CA); Patrice Fiset, Lasalle (CA)

(73) Assignee: Pratt & Whitney Canada Corp., Longueuil QC (CA)

(*) Notice: Subject to any disclaimer, the term of this patent is extended or adjusted under 35 U.S.C. 154(b) by 1119 days.

(21) Appl. No.: 11/386,940

(22) Filed: Mar. 23, 2006

(65) Prior Publication Data

US 2007/0236693 A1 Oct. 11, 2007

(51) Int. Cl.
*G06K 9/00* (2006.01)
*G06K 9/46* (2006.01)

(52) U.S. Cl. .............. 382/152; 382/141; 382/203
(58) Field of Classification Search ............ 356/336; 239/533.2; 382/141, 143, 152, 173, 203, 382/190
See application file for complete search history.

(56) References Cited

U.S. PATENT DOCUMENTS

| | | | | |
|---|---|---|---|---|
| 3,275,744 A * | 9/1966 | Dietrich | .............. | 348/132 |
| 3,609,043 A * | 9/1971 | Simmons et al. | .......... | 356/335 |
| 3,975,141 A * | 8/1976 | Sweet | .............. | 431/352 |
| 4,357,670 A * | 11/1982 | McFarlane | .............. | 700/283 |
| 4,670,840 A * | 6/1987 | Freundlich | .............. | 378/7 |
| 5,337,926 A * | 8/1994 | Drobish et al. | .............. | 222/309 |
| 5,757,498 A * | 5/1998 | Klein et al. | .............. | 356/630 |
| 6,665,421 B1 * | 12/2003 | Farina | .............. | 382/100 |
| 6,734,965 B2 * | 5/2004 | Talley et al. | .............. | 356/318 |
| 6,742,168 B1 * | 5/2004 | Nariman | .............. | 716/4 |
| 6,785,400 B1 * | 8/2004 | Farina | .............. | 382/100 |
| 6,973,199 B2 * | 12/2005 | Farina | .............. | 382/100 |
| 7,100,839 B2 * | 9/2006 | Farina et al. | .............. | 239/69 |
| 7,463,751 B2 * | 12/2008 | Farina | .............. | 382/100 |
| 7,490,782 B2 * | 2/2009 | Farina et al. | .............. | 239/140 |
| 2002/0108239 A1 * | 8/2002 | Isogai et al. | .............. | 29/834 |
| 2003/0156297 A1 * | 8/2003 | Skunes et al. | .............. | 356/615 |
| 2004/0037462 A1 * | 2/2004 | Lewis et al. | .............. | 382/181 |
| 2004/0131243 A1 * | 7/2004 | Farina | .............. | 382/141 |
| 2004/0258278 A1 * | 12/2004 | Farina | .............. | 382/100 |
| 2005/0058334 A1 * | 3/2005 | Armstrong | .............. | 382/141 |
| 2005/0263620 A1 | 12/2005 | Prieto et al. | | |
| 2006/0034504 A1 * | 2/2006 | Farina | .............. | 382/141 |
| 2006/0081039 A1 * | 4/2006 | Scheer | .............. | 73/65.02 |
| 2007/0285454 A1 * | 12/2007 | Shang et al. | .............. | 347/19 |
| 2008/0318163 A1 * | 12/2008 | Fromson et al. | .............. | 430/302 |
| 2009/0141928 A1 * | 6/2009 | Armstrong | .............. | 382/100 |
| 2009/0242661 A1 * | 10/2009 | Lu | .............. | 239/102.2 |

OTHER PUBLICATIONS

Sankar et al "Time Resolved of Liquid Mass Distribution in a Fuel Injector Spray Using an Optical Patternator"; pp. 1-5; 266-270.*
Deljouravesh. "An Optical Patternator for Quantitative And On-Line Spray Diagnostics" Department of Mechanical Engineering-Oct. 1997.*
McClean et al. "Optical Patternation: A Technique for three-dimensional Aerosol Diagnostics" Anal. Chem Oct. 15, 2000, 72, 4796-4804.*

* cited by examiner

*Primary Examiner*—Bhavesh M Mehta
*Assistant Examiner*—Mia M Thomas
(74) *Attorney, Agent, or Firm*—Ogilvy Renault LLP

(57) ABSTRACT

The present invention provides a method of calibrating a fuel nozzle patternation system. The method includes testing a master nozzle having desired spray characteristics in the system to determine a virtual origin of the system and then using the virtual origin to replace a fixed spatial origin of the system for testing other nozzles of the same nozzle family.

12 Claims, 4 Drawing Sheets

CALIBRATION OF OPTICAL PATTERNATOR SPRAY PARAMETER MEASUREMENTS

TECHNICAL FIELD

The invention relates generally to what is referred herein as "patternation", performing quantitative measurements of specific properties of particles within a particle field such as a spray, and more particularly relates to an improved calibration of a fuel nozzle optical patternation system in spray parameter measurements.

BACKGROUND OF THE ART

Fuel nozzles, such as in gas turbine engines, direct pressurized fuel from a manifold to one or more combustion chambers. Fuel nozzles also prepare the fuel for mixing with air prior to combustion. Therefore, the pattern and quantitative parameters of a fuel nozzle spray significantly affect combustion and thus the efficiency of engine performance. It is important to collect spray information to analyze spray parameters of fuel nozzles during a design stage of a new family of fuel nozzles and during the manufacturing process of every production batch of fuel nozzles, in order to ensure that newly designed fuel nozzles meet the requirements of the desired spray parameters for a gas turbine engine, and to be able to implement meaningful quality control of every production batch of fuel nozzles in accordance with the designed spray parameters, within allowed limits.

Fuel nozzle spray patternation technology has been used for quantitative analysis of a spray of a fuel nozzle to determine the quantitative spray parameter, however there is always room for improvement.

Accordingly, there is a need to provide an improved method of computing spray parameters of a fuel nozzle from the patternation thereof.

SUMMARY OF THE INVENTION

It is therefore an object of this invention to provide a method of calibrating a fuel nozzle optical patternation system in spray parameter measurements.

In one aspect, the present invention provides a method of calibrating a fuel nozzle optical patternation system which comprises obtaining a master nozzle having desired spray characteristics; obtaining at least one image of a spray of the master nozzle at a first predetermined plane from the optical patternation system; determining a virtual spray origin of the optical patternation system by analyzing the at least one image of the spray of the master nozzle; obtaining at least one image of a spray of a second nozzle at a second predetermined plane from the optical patternation system; and then quantifying spray characteristics of the second nozzle relative to the virtual spray origin.

In another aspect, the present invention provides a method of calibrating a fuel nozzle optical patternation system, which comprises obtaining at least one image of a spray of a master nozzle at a predetermine plane from the optical patternation system, the master nozzle having desired spray characteristics; calculating a spray centroid on the predetermined plane with respect to a fixed spatial origin of the optical patternation system, by using the at least one image of the spray of the master nozzle; and calibrating the optical patternation system using the spray centroid as a virtual spray origin to replace the fixed spatial origin of the optical patternation system when at least another nozzle of a nozzle family including the master nozzle is tested in the optical patternation system.

In a further aspect, the present invention provides a method for calibrating a fuel nozzle patternation system, which comprises obtaining a master nozzle having desired spray characteristics; obtaining information on spray characteristics of the master nozzle in a test performed in the patternation system, with respect to a fixed spatial origin of the patternation system; calculating a spray centroid for the master nozzle using the obtained information on spray characteristics thereof; and calibrating the patternation system using the spray centroid as a virtual spray origin to replace the fixed spatial origin of the patternation system when at least another nozzle of a nozzle family including the master nozzle is tested in the patternation system.

Further details of these and other aspects of the present invention will be apparent from the detailed description and figures included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
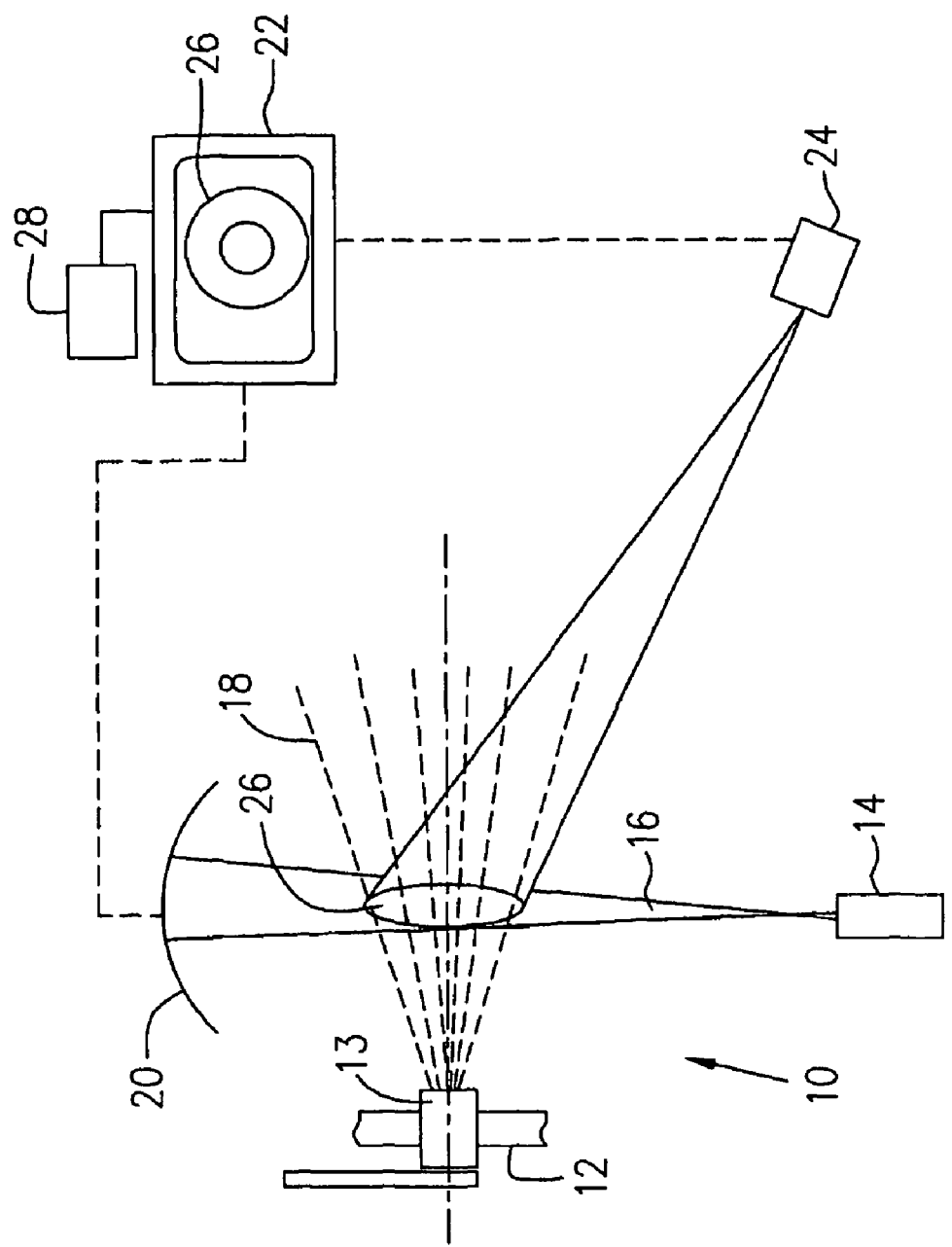
FIG. 1 is a schematic illustration showing a fuel nozzle optical patternation system according to one embodiment of the present invention.
Figure 2:
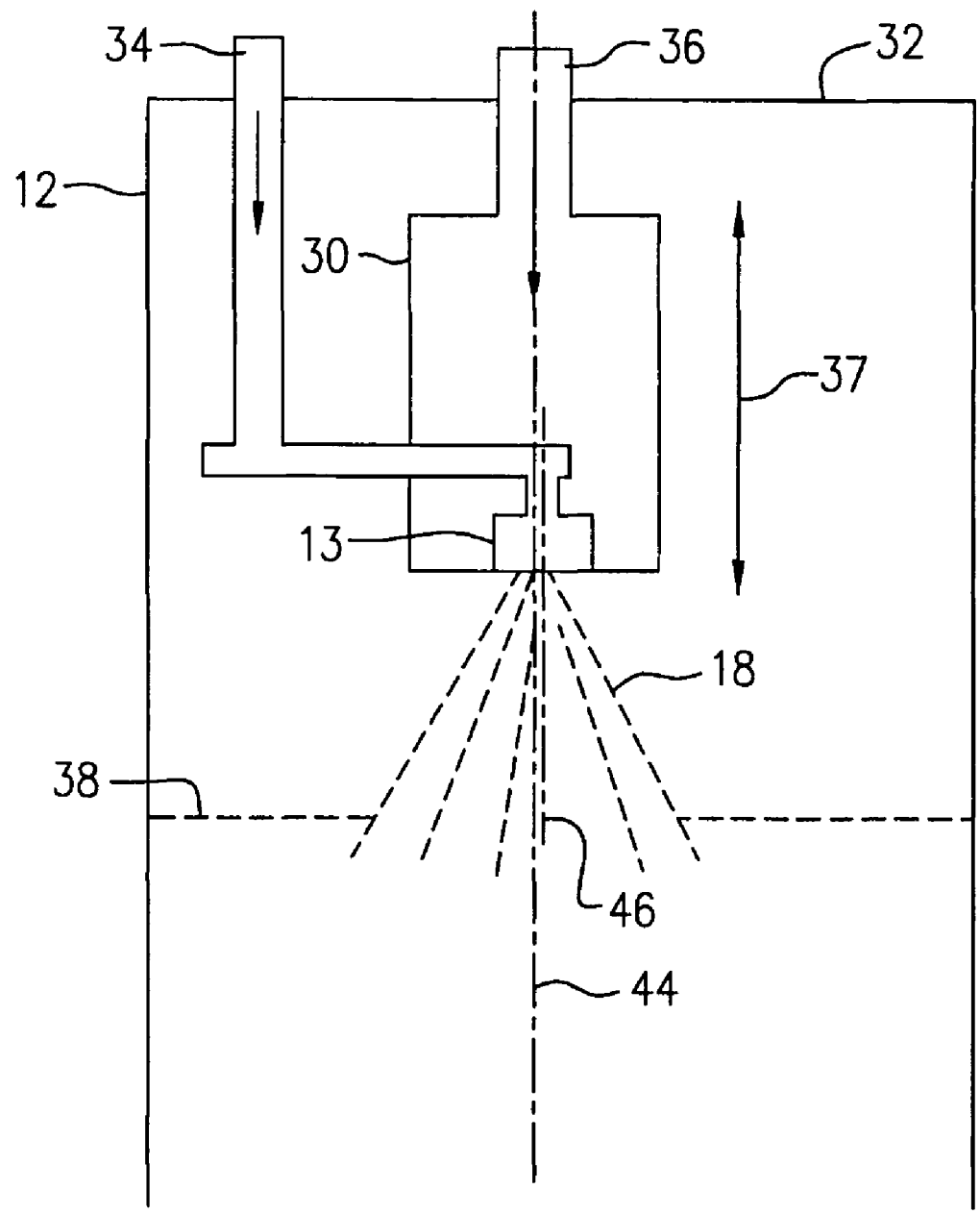
FIG. 2 is a schematic illustration of a fuel nozzle mounting apparatus with a spray booth associated with the fuel nozzle optical patternation system of FIG. 1.
Figure 3:
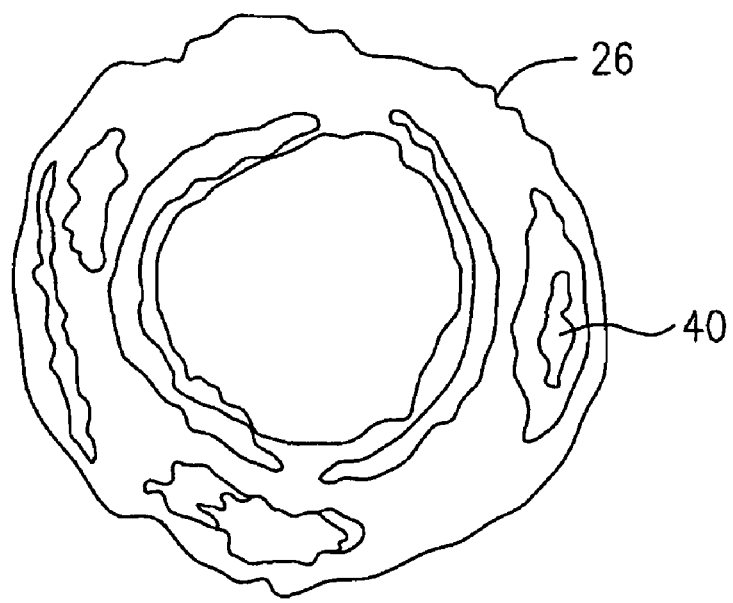
FIG. 3 is s schematic illustration of an image of a spray of a master nozzle, obtained from the fuel nozzle optical patternation system of FIG. 1.

FIGS. 1 and 2 illustrate the inspection and characterization of fuel nozzle sprays using optical patternation of sprays. Optical patternation of sprays does not directly measure liquid mass distributions of the sprays, but instead measures light intensity distributions of an image of sprays to quantify nozzle quality. An optical patternation system generally indicated by numeral 10 includes a nozzle mounting apparatus 12 for securing a nozzle 13 in a predetermined position for testing, and a planar laser sheet generator 14 positioned relative to the nozzle mounting apparatus 12 such that a planar laser sheet 16 generated from the planar laser sheet generator 14 intercepts a spray 18 generated by the fuel nozzle 13 at an angle substantially normal to the direction of the spray. An array of diodes 20 is positioned at the opposite side of the spray 18 with respect to the planar laser sheet generator 14 and is aligned with the planar laser sheet 16 for receiving same. The array of diodes 20 is connected to a computer 22 to which data relating to the laser lighting factors is transmitted. The planar laser sheet 16 intersects the spray 18 and droplets in the spray 18 scatter the laser light when passing through the plane defined by the planar laser sheet 16, thereby creating an image of the spray 18. A digital camera 24 is provided to receive the light scattered by the spray 18 and to thus record an image 26 of the spray 18. The digital camera 24 is preferably connected to the computer 22 such that the image data collected by the digital camera 24 can be sent directly to the computer 22 for on-line display of the image 26 and for computing of spray parameters. However, the digital image data received by the camera 24 can be optionally recorded in a computer readable medium and can retrieved by the computer 22 from the computer readable medium, off-line in a later time. A software 28 associated with the computer 22 is provided for computing spray parameters using the image data received by the computer 22.

The mounting apparatus 12 further includes a nozzle mounting box 30 for receiving and positioning the fuel nozzle 13 during testing, and a spray booth 32 including a fuel inlet 34 and an air inlet 36 in fluid communication with the respective fuel nozzle 13 and nozzle mounting box 30 to simulate a fuel and air supply to the fuel nozzle 13 under gas turbine engine operating conditions. The nozzle mounting box 30 is preferably adjustable, as indicated by arrow 37, relative to a laser measurement plane 38 which is defined by the planar laser sheet 16 generated by the generator 14 of the fuel nozzle optical patternation system 10.

Reference will now be made to FIGS. 1-6. The image 26 of spray 18 of fuel nozzle 13, obtained by the fuel nozzle optical patternation system 10 is shown with details in FIG. 3. Variation in colour shown in image 26 corresponds with the variation in light intensity captured by the digital camera 24. High light intensity levels such as those indicated by numeral 40 correspond to zones of high spray density. Therefore, the image 26 can be converted to show the annular nature of spray distribution as it exists in the laser measurement plane 38 which is downstream of the fuel nozzle 13 and defined by the planar laser sheet 16.

Corrections are preferably made to the image data recorded by the digital camera 24 in order to compensate for shadowing effects, light plane non-uniformities, and camera view angle. Thus, a substantially true optical image 26 of the cross-section of the spray 18 can be obtained in the computer 22 and displayed on the monitor screen thereof.

Furthermore, certain laser lighting factors including laser light sheet homogeneity, spreading of the light sheet, the efficiency with which light is scattered through different angles, etc., can affect the resulting image 26 of spray 18, and therefore, those laser lighting factors are preferably properly adjusted and consistently maintained during testing of a production batch of fuel nozzles.

In addition, several factors have been known to contribute to a lack of repeatability which can be encountered with optical patternation system installations. Some of these factors are specific to the particular optical patternation system 10 while others are related to the mounting apparatus 12 with which the optical patternation system 10 is associated. A method for reducing or eliminating some of these variabilities is described below according to an embodiment of the present invention.

A partitioning image 42, as a virtual mechanical collector geometry, is created by the software 28 of the computer 22 and is superposed onto the processed optical spray image 26. Based on the collector geometry, a number of quantifiable spray parameters such as circumferential spray uniformity and radial fuel geometry, can be defined and calculated for quantifying spray quality. These are basically measurements of distribution about an origin indicated by the letter O in FIG. 4 which represents a fixed spatial origin of the system as a collector origin used in mechanical systems, and which is simulated in optical systems by identifying a unique pixel in the digital image at the centre of the system around which distributions are computed. The center of the system is the point in the laser measurement plane 38 (also the planar laser sheet 16) through which a central axis 44 of the mounting apparatus 12 extends. The central axis 44 is theoretically superposed on the central axis 46 of the fuel nozzle 13 mounted to the mounting apparatus 12. Therefore, the origin O as a fixed spatial origin of the patternation system, theoretically represents the center of the fuel nozzle 13 in testing.

However, it is common for components of mounting apparatus 12 to shift slightly under repeated wear and tear encountered in a production setting where frequent mounting and re-positioning of nozzles must take place. This is particularly true of some rig mounting components unique to a given nozzle family which must be exchanged when that nozzle family is in production. A small drift in any of the system components can result in shifting of the central axis 46 of the fuel nozzle 13 in testing, away from the central axis 44 of the mounting apparatus 12, and thus in variation of the output measurement and consequently poor repeatability. This can go undetected in normal production runs.

An improved method of analyzing the processed spray image incorporates a floating or virtual collector origin and a unique master nozzle used for the measurement of a particular nozzle family. A master nozzle is one that is identified early in the development cycle of a given nozzle family as having an ideal spray distribution. This nozzle is taken out of production and is retained as a physical template against which future nozzles are compared and evaluated.

Figure 4:
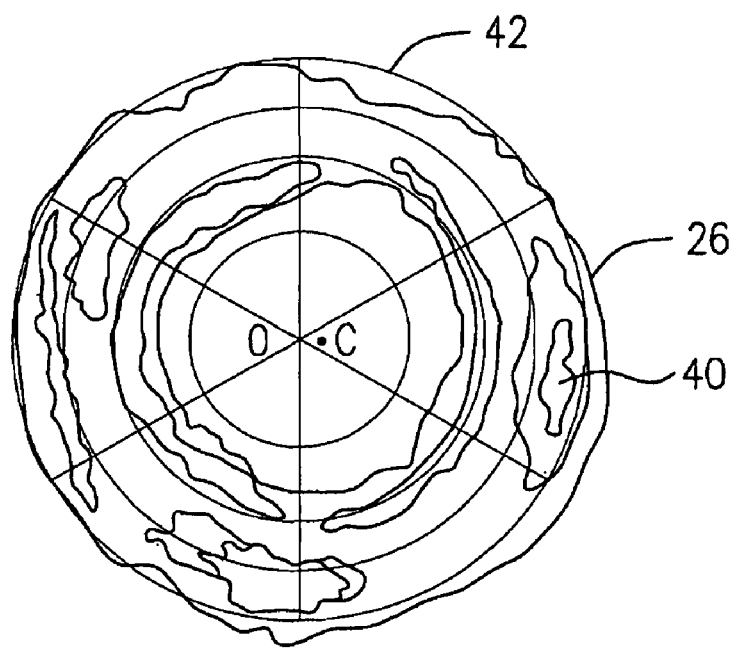
FIG. 4 is a schematic illustration similar to FIG. 3 showing a centroid of the spray defined on a plane of the image of the master nozzle.

Prior to running a production batch, a master nozzle is installed in the nozzle mounting apparatus 12 and a processed optical image is obtained for the master spray. The spray is analysed, based on the light intensity corresponding to the droplet distribution. A spray centroid for the master spray defined in laser measurement plane 38 can thus be calculated. The image 26 is used as the image of the spray of the master nozzle, and the calculated centroid is indicated by letter C and should be ideally superposed onto fixed spatial origin O. However, due to the above-discussed installation factors, the calculated centroid C of the spray of the master nozzle may shift away form the fixed spatial origin O, as shown in FIG. 4.

The calculated spray centroid C is defined via an x and y coordinate relative to the fixed spatial origin O (see FIG. 5) for the optical patternation system 10. The spray centroid C of the master nozzle then represents the floating or virtual spray origin which will be used for subsequent fuel nozzle measurements in the same nozzle family.

Figure 6:
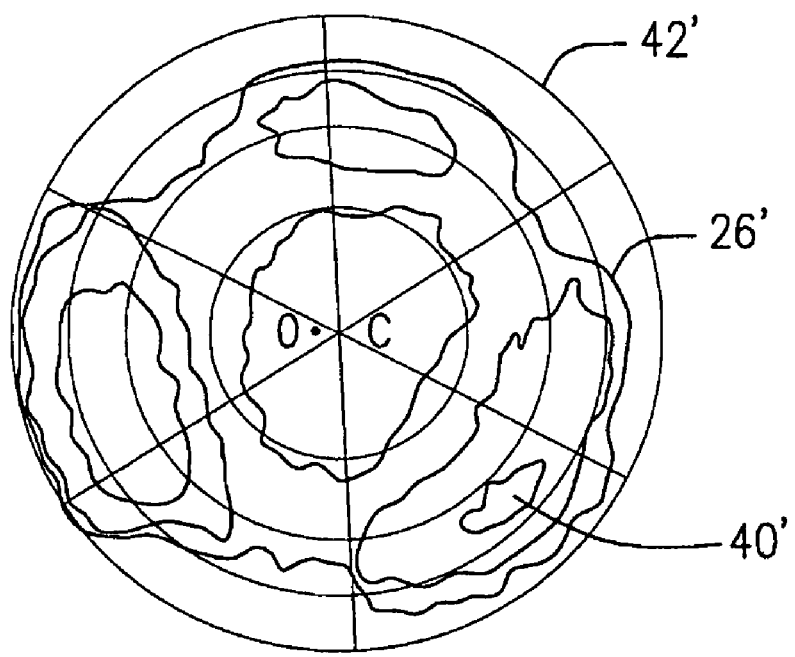
FIG. 6 is a schematic illustration of an image of a spray of another fuel nozzle of a nozzle family including the master nozzle, obtained in the fuel nozzle optical patternation system of FIG. 1.

FIG. 6 illustrates an image 26' of a spray of another fuel nozzle belonging to the same family of the master nozzle, in which the origin of the partitioning image 42' is defined at the point of the calculated centroid C of the master nozzle spray, instead of at the fixed spatial origin O of the optical patternation system 10. Numeral 40' indicates the high light intensity levels. Spray parameters such as circumferential spray uniformity, radial fuel geometry and spray angle are then calculated for any given nozzle spray using the floating or virtual origin derived from a master nozzle. In this way, even extremely loose physical tolerances exhibited by the mounting apparatus 12 will not impact the accuracy and repeatability of the optical patternation system 10.

Figure 5:
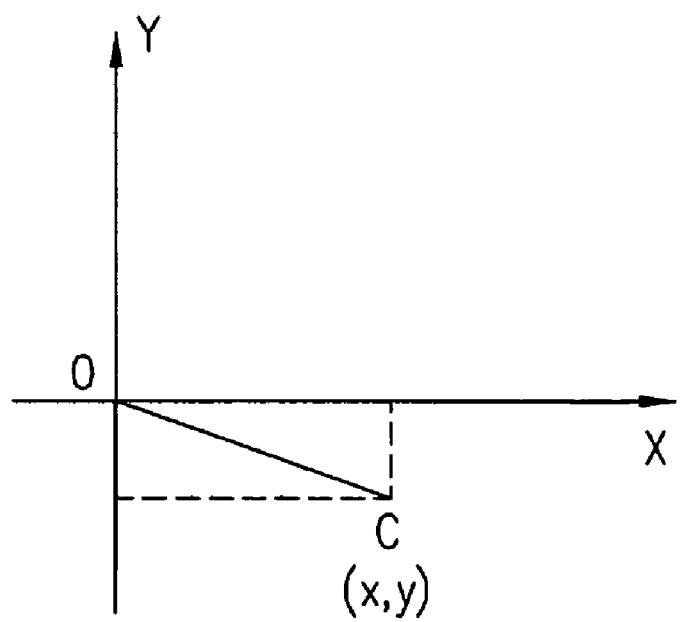
FIG. 5 is an illustration of the relationship between the centroid of the spray of the master nozzle on the plane of the image thereof and a fixed spatial origin of the fuel nozzle optical patternation system of FIG. 1 in an x and y coordination system.

This procedure of using the master nozzle to determine a floating or virtual origin can be performed for the particular nozzle family of the master nozzle prior to every production batch to be tested or on a daily basis to account for and further compensate for spatial drift in any of the system components. In addition, control limits can be established for the master spray parameters such that shift beyond certain limits will require maintenance/investigation actions for the system and can thus act as means to control and maintain the repeatability and reproducibility of the optical patternation system 10. For example, when the distance between the fixed spatial origin O and the calculated centroid C (the OC distance) in FIG. 5 is greater than a predetermined distance, the optical patternation system 10 including the mounting apparatus 12 should not be used until adjustments have been conducted to bring the OC distance to within predetermined limits.

In accordance with another embodiment of the present invention, the method of calibrating a fuel nozzle optical patternation system using a master nozzle can be applied to a mechanical patternation system (not shown). During the test of the master nozzle, a physical collector can be centralized about the fixed spatial origin of the system to collect the fuel liquid into separate chambers thereof, and then the centroid of the master nozzle spray can be calculated. The position of the centroid of the master nozzle spray relative to the fixed spatial origin is marked in the mechanical patternation system as a floating or virtual origin. During the procedure of inspection of other fuel nozzles in the same family, the physical collector will be centralized using the floating or virtual origin rather than the fixed spatial origin of the system.

The above description is meant to be exemplary only, and one skilled in the art will recognize that changes may be made to the embodiments described without departure from the scope of the invention disclosed. For example, although a centroid of a master nozzle spray is preferred to define the floating or virtual origin, other parameters of the master nozzle spray such as a geometric center of the image of the master nozzle spray may be used to define the floating or virtual origin in order to replace the fixed spatial origin of the system. Still other modifications which fall within the scope of the present invention will be apparent to those skilled in the art, in light of a review of this disclosure, and such modifications are intended to fall within the appended claims.

The invention claimed is:

1. A method of calibrating a fuel nozzle optical patternation system, the method comprising:
    (a) positioning a master nozzle in the fuel nozzle optical patternation system, the master nozzle identified in a nozzle family as having desired spray characteristics for use as a physical template against which other nozzles of the family are compared and evaluated;
    (b) obtaining a computer readable image record of a cross-section of a spray of the master nozzle in a planar laser sheet generated by the system;
    (c) processing data in the image record to determine a point in the image record as a virtual origin of the spray of the master nozzle, with reference to a fixed spatial origin of the system; and
    (d) calibrating the system in testing other nozzles of the family by using the point of the virtual origin derived from step (c) instead of the fixed spatial origin of the system as a reference point of a fuel nozzle optical patternation performed in the system.

2. The method as defined in claim 1 wherein the virtual origin is a spray centroid as a calculated result in step c.

3. The method as defined in claim 2 wherein the spray centroid is defined via x and y coordinates relative to the fixed spatial origin of the optical patternation system.

4. The method as defined in claim 3 comprising a step of terminating the use of the optical patternation system when the spray centroid is defined in a position having a distance greater than a predetermined distance with respect to the fixed spatial origin of the optical patternation system.

5. The method as defined in claim 1 wherein the virtual origin is a geometric center of the image record.

6. The method as defined in claim 1 further comprising steps of repeating steps (a), (b) and (c) at predetermined intervals to obtain a new point of a virtual origin of the spray of the master nozzle each time and then recalibrating the system each time using the new point of the virtual origin instead of the previous point of the virtual origin in order to replace the fixed spatial origin of the system.

7. The method as defined in claim 6 wherein the recalibration of the system is conducted at each time prior to every one of a production batch of nozzles to be tested in the system.

8. A method of calibrating a fuel nozzle optical patternation system, the method comprising:
    (a) positioning a master nozzle in the optical patternation system, the master nozzle identified in a nozzle family as having desired spray characteristics; for use as a physical template against which other nozzles of the family are compared and evaluated;
    (b) obtaining a computer readable image record of a cross-section of a spray of the master nozzle created by the system;
    (c) calculating a spray centroid of the master nozzle by processing data in the image record with reference to a point corresponding to a fixed spatial origin of the optical patternation system; and
    (d) calibrating the optical patternation system using the spray centroid as a virtual spray origin to replace the fixed spatial origin of the optical patternation system, to be used as the reference point when at least another nozzle of the nozzle family is tested in the optical patternation system.

9. The method as defined in claim 8 further comprising steps of:
    (e) determining whether or not the spray centroid is defined in a position within a predetermined area with respect to the fixed spatial origin of the optical patternation system; and
    (f) investigating the optical patternation system if a result of step (e) is negative.

10. The method as defined in claim 8 comprising steps of repeating steps (a), (b) and (c) at predetermined intervals in order to calculate a new spray centroid; and then recalibrating the optical patternation system using the new spray centroid as a new virtual spray origin.

11. The method as defined in claim 8 wherein step (c) is practised by defining the spray centroid in an x and y coordinate system with respect to the fixed spatial origin of the optical patternation system.

12. A method for calibrating a fuel nozzle patternation system, the method comprising:
    (a) positioning a master nozzle in the system, the master nozzle identified in a nozzle family as having desired spray characteristics for use as a physical template against which other nozzles of the family are compared and evaluated;
    (b) obtaining information on spray characteristics of the master nozzle in a test performed in the patternation system, with reference to a point corresponding to a fixed spatial origin of the patternation system;
    (c) calculating a spray centroid for the master nozzle using the obtained information on spray characteristics thereof; and
    (d) calibrating the patternation system using the spray centroid as a virtual spray origin to replace the fixed spatial origin of the patternation system to be used as the reference point when at least another nozzle of the nozzle family is tested in the patternation system.

* * * * *